US011579018B1

(12) United States Patent
Hastings et al.

(10) Patent No.: US 11,579,018 B1
(45) Date of Patent: Feb. 14, 2023

(54) THERMAL IMAGING TEST ARTICLE

(71) Applicant: The Government of the United States of America, as represented by the Secretary of Homeland Security, Washington, DC (US)

(72) Inventors: William Hastings, Alexandria, VA (US); Kevin Gemp, Falls Church, VA (US); Elyssa Kaplan, Middleton, MA (US); Kevin Dickey, Arlington, VA (US); Daniel Sims, McLean, VA (US)

(73) Assignee: The Government of the United States of America, as represented by the Secretary of Homeland Security, Washington, DC (US)

( * ) Notice: Subject to any disclaimer, the term of this patent is extended or adjusted under 35 U.S.C. 154(b) by 0 days.

(21) Appl. No.: 17/863,112

(22) Filed: Jul. 12, 2022

Related U.S. Application Data

(60) Provisional application No. 63/221,801, filed on Jul. 14, 2021.

(51) Int. Cl.
*G01J 5/53* (2022.01)
*G01J 5/10* (2006.01)
*G01J 5/48* (2022.01)
*G01J 5/80* (2022.01)
*G01J 5/00* (2022.01)

(52) U.S. Cl.
CPC . *G01J 5/53* (2022.01); *G01J 5/10* (2013.01); *G01J 5/485* (2022.01); *G01J 5/80* (2022.01); *G01J 2005/0077* (2013.01)

(58) Field of Classification Search
CPC ......... G09B 23/30; G09B 23/303; G01J 5/53; G01J 5/80; G01K 15/00; G01K 15/007; G01K 15/005; G01K 15/002
See application file for complete search history.

(56) References Cited

U.S. PATENT DOCUMENTS

| | | | | | |
|---|---|---|---|---|---|
| 5,023,459 A | * | 6/1991 | Osborn | ...................... | G01J 5/53 250/352 |
| 5,265,958 A | * | 11/1993 | Ludlow | ...................... | G01J 5/53 374/2 |
| 6,543,657 B2 | * | 4/2003 | Fan | ........................ | G01N 25/18 223/66 |
| 6,957,961 B1 | * | 10/2005 | Owens | .................... | G09B 23/28 434/270 |

FOREIGN PATENT DOCUMENTS

EP            0063415 A1 * 10/1982

* cited by examiner

*Primary Examiner* — Lisa M Caputo
*Assistant Examiner* — Janice M Soto
(74) *Attorney, Agent, or Firm* — Lavanya Ratnam; Robert W. Busby; William Washington

(57) ABSTRACT

In an example, a thermal imaging test article comprises a block configured to be attached to a blackbody on a back side of the block, the block having a variable thickness to represent facial features of a human face, the block including a cutout to allow a thermal imaging device to see the blackbody behind the block through the cutout, and one or more heaters thermally coupled to the block to produce heat to heat the block. The variable thickness of the block and the heat produced by the one or more heaters are selected to simulate thermally the human face on a front side of the block.

21 Claims, 12 Drawing Sheets
(3 of 12 Drawing Sheet(s) Filed in Color)

THERMAL IMAGING TEST ARTICLE

CROSS-REFERENCE TO RELATED APPLICATIONS

The application is a nonprovisional of and claims the benefit of priority from U.S. Provisional Patent Application No. 63/221,801, filed on Jul. 14, 2021, entitled THERMAL IMAGING TEST ARTICLE, the disclosure of which is incorporated by reference in its entirety.

STATEMENT OF GOVERNMENT INTEREST

The present invention was made with support from the United States Department of Homeland Security (DHS) under contract HSHQDC-14-D-00006 and by an employee of DHS in the performance of their official duties. The U.S. Government has certain rights in this invention.

FIELD

The discussion below relates generally to thermal imaging and, more particularly, to a thermal imaging test article for use in evaluating thermal imaging equipment.

BACKGROUND

Touchless facial temperature measurement devices, kiosks, and the like have become ubiquitous since the COVID-19 outbreak. Examples include thermal imaging cameras and devices available from Flir Systems, Infrared Cameras, Inc. (ICI), etc. The devices are placed in various locations and operate in a variety of different environments. Many of these devices perform temperature measurements only after detecting the presence of a human face.

SUMMARY

Embodiments of the present invention are directed to a tool set or kit to test a thermal imaging device to evaluate its accuracy, usability, performance, tolerance threshold, or the like. The tool kit may be a thermal imaging test article that include a face block which is mechanically designed, constructed, and heated to simulate a human face in the thermal spectrum and optionally the optical spectrum as well.

The thermal imaging test article improves the ability to evaluate thermal imaging systems, without the need for live human subjects, in their use environments. In a specific embodiment, the thermal imaging test article is a 3D printed blackbody cap that is specifically designed to accurately simulate thermally (and optionally optically) a human face. This test article will enable private organizations and government agencies such as the TSA to conduct configuration and accuracy test events, allowing for a consistent and thorough assessment of a variety of thermal imaging units in different use environments.

In one example, the thermal imaging test article includes an approximately 7-inch×10-inch 3D printed block having a variable thickness. Thin silicone rubber heaters may be attached to the back of the block, which is attached to a blackbody of a known temperature. When the heaters are turned on, the thermal imaging camera recognizes the block as a human face based on the thermal pattern (e.g., the surface temperature profile on the front side of the block) produced by the block with a variable thickness and the heating generated by the heaters. The thermal imaging test article assembly is then placed on a tripod in front of a thermal imaging camera for testing and evaluating the camera. The blackbody can be seen through one or more cutouts in the block and be used for calibration of the camera for temperature measurement.

In accordance with an aspect, a thermal imaging test article comprises a block configured to be attached to a blackbody on a back side of the block, the block having a variable thickness to represent facial features of a human face, the block including a cutout to allow a thermal imaging device to see the blackbody behind the block through the cutout, and one or more heaters thermally coupled to the block to produce heat to heat the block. The variable thickness of the block and the heat produced by the one or more heaters are selected to simulate thermally the human face on a front side of the block.

In accordance with another aspect, a thermal imaging device assessment tool comprises a face block configured to be attached to a blackbody on a back side of the face block, the face block having a variable thickness based on a variable surface temperature profile of a human face, the face block including a cutout to allow radiation to pass through to the blackbody behind the face block, and means for heating the face block having the variable thickness to simulate thermally the variable surface temperature profile of the human face on a front side of the face block.

Yet another aspect is directed to a method of testing a thermal imaging device. The method comprises attaching a block to a blackbody on a back side of the block, the block having a variable thickness based on a variable surface temperature profile of a human face, the block including a cutout to allow radiation to pass through to the blackbody behind the block, the blackbody having a known temperature; heating the block having the variable thickness to simulate thermally the variable surface temperature profile of the human face on a front side of the block; and directing a radiation from the thermal imaging device to the block to detect the front side of the block as the human face and through the cutout to measure a temperature of the blackbody to obtain a measured temperature of the blackbody.

Other features and aspects of various examples and embodiments will become apparent to those of ordinary skill in the art from the following detailed description which discloses, in conjunction with the accompanying drawings, examples that explain features in accordance with embodiments. This summary is not intended to identify key or essential features, nor is it intended to limit the scope of the invention, which is defined solely by the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The attached drawings help explain the embodiments described below.

DETAILED DESCRIPTION

This detailed description, like the drawings, omits various details to help focus the reader's attention to the key points. A number of examples or embodiments of the present invention are described, and it should be appreciated that the present invention provides many applicable inventive concepts that can be embodied in a variety of ways. The embodiments discussed herein are merely illustrative of ways to make and use the invention and are not intended to limit the scope of the invention. Rather, as will be appreciated by one of skill in the art, the teachings and disclosures herein can be combined or rearranged with other portions of this disclosure along with the knowledge of one of ordinary skill in the art.

The mechanical design and thermal analysis of a thermal imaging test article or thermal imaging device assessment tool are described. In embodiments, the test article or assessment tool is a block intended to represent a human face that can be recognized by a thermal imaging camera. Once the thermal imaging system under examination recognizes a face, its effectiveness can be interrogated. A relatively rough mechanical design is made initially to prove the concept in a field test and can then be refined or updated. The initial design is used to create a block that can be quickly 3D printed, have heat applied, and be identified as a face when placed in front of a thermal camera. A thermal analysis is conducted in conjunction with the mechanical design work to create an object that represents the heat signature typically seen on a human face through a thermal camera. The following describes details on the design, analysis, and testing of the 3D printed face block.

Figure 1:
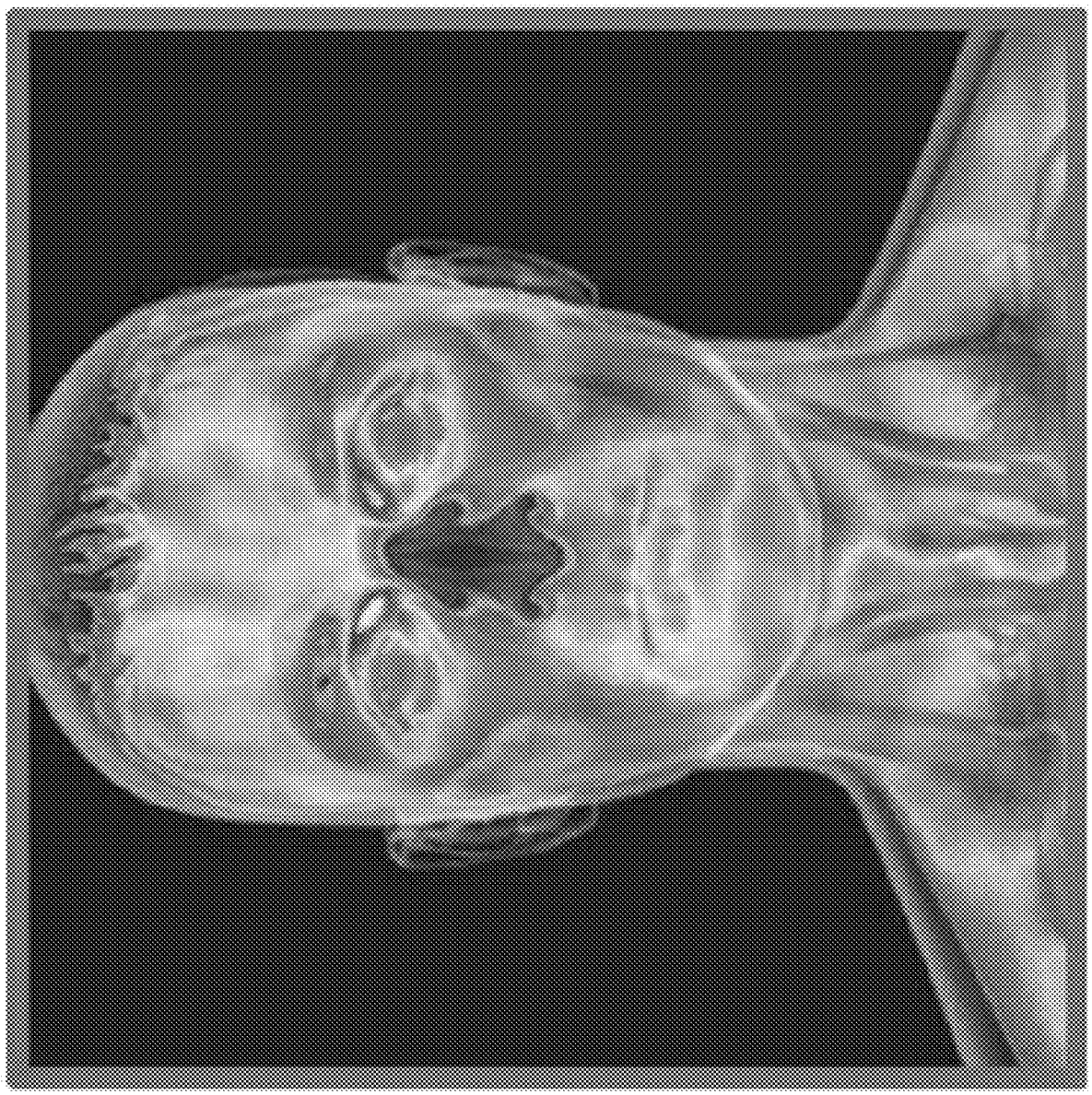
FIG. 1 shows an example of a thermal image of a human face.

FIG. 1 shows an example of a thermal image of a human face. The mechanical design of the thermal imaging test article is created in conjunction with a thermal analysis. FIG. 1 is a thermal image of a face that is used as an example to create the facial features of a face block of the thermal imaging test article. The facial features that are cooler need more thickness for the face block causing the front to reach a lower temperature by heating from the back of the face block (e.g., regions of the nose and cheeks are typically the coolest). The facial features that are warmer need less thickness for the face block causing the front to reach a higher temperature by heating from the back of the face block (e.g., regions of the forehead and around the eyes and mouth are typically the warmest). The thicknesses of the various facial features of the face block and the heater powers for heating the back of the face block may be tweaked or adjusted until the calculated surface temperature profile at the front of the face block appears acceptable, for example, for a field test.

Figure 3:
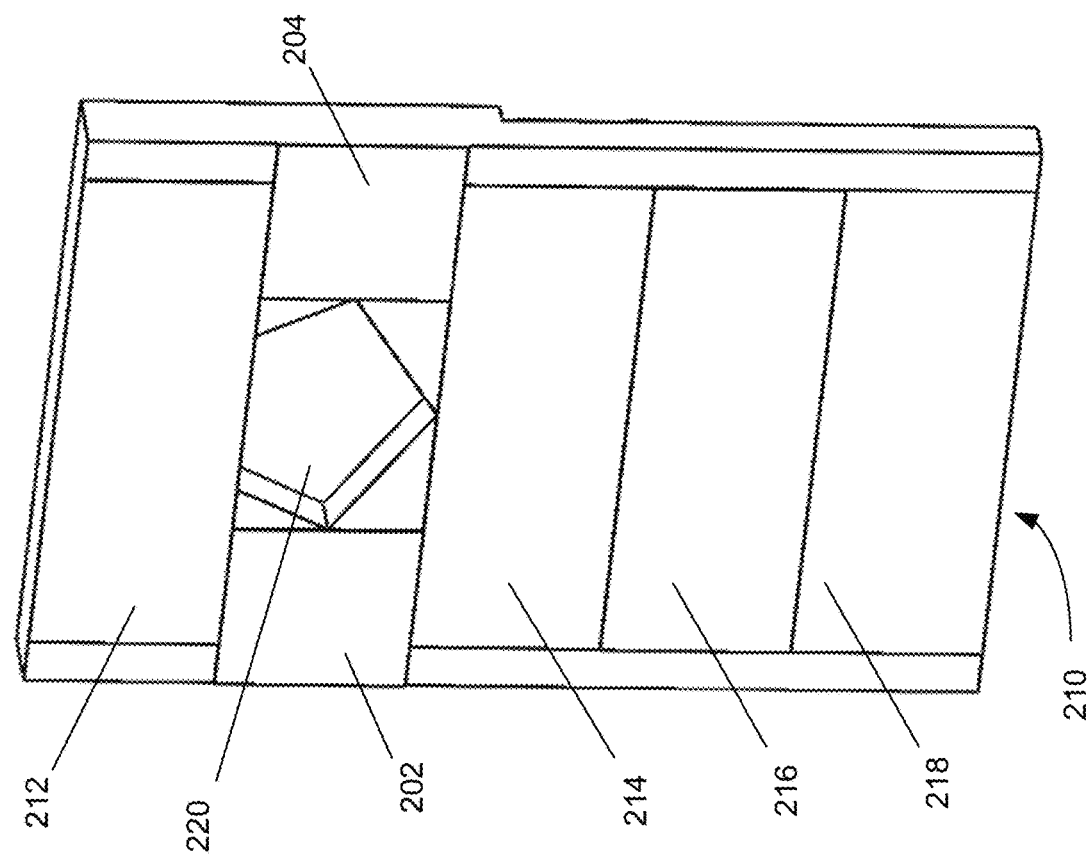
FIG. 3 is a back view of the thermal model of FIG. 2 having an outline for heaters.
Figure 2:
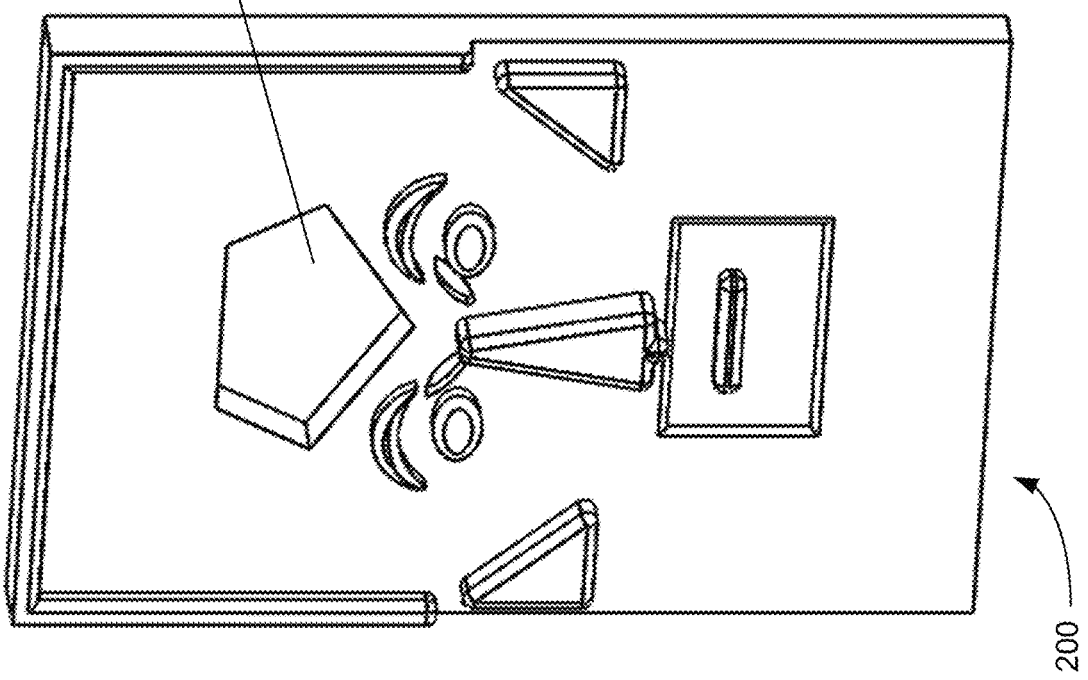
FIG. 2 is a front view of an example of a thermal model having a facial geometry.
Figure 4:
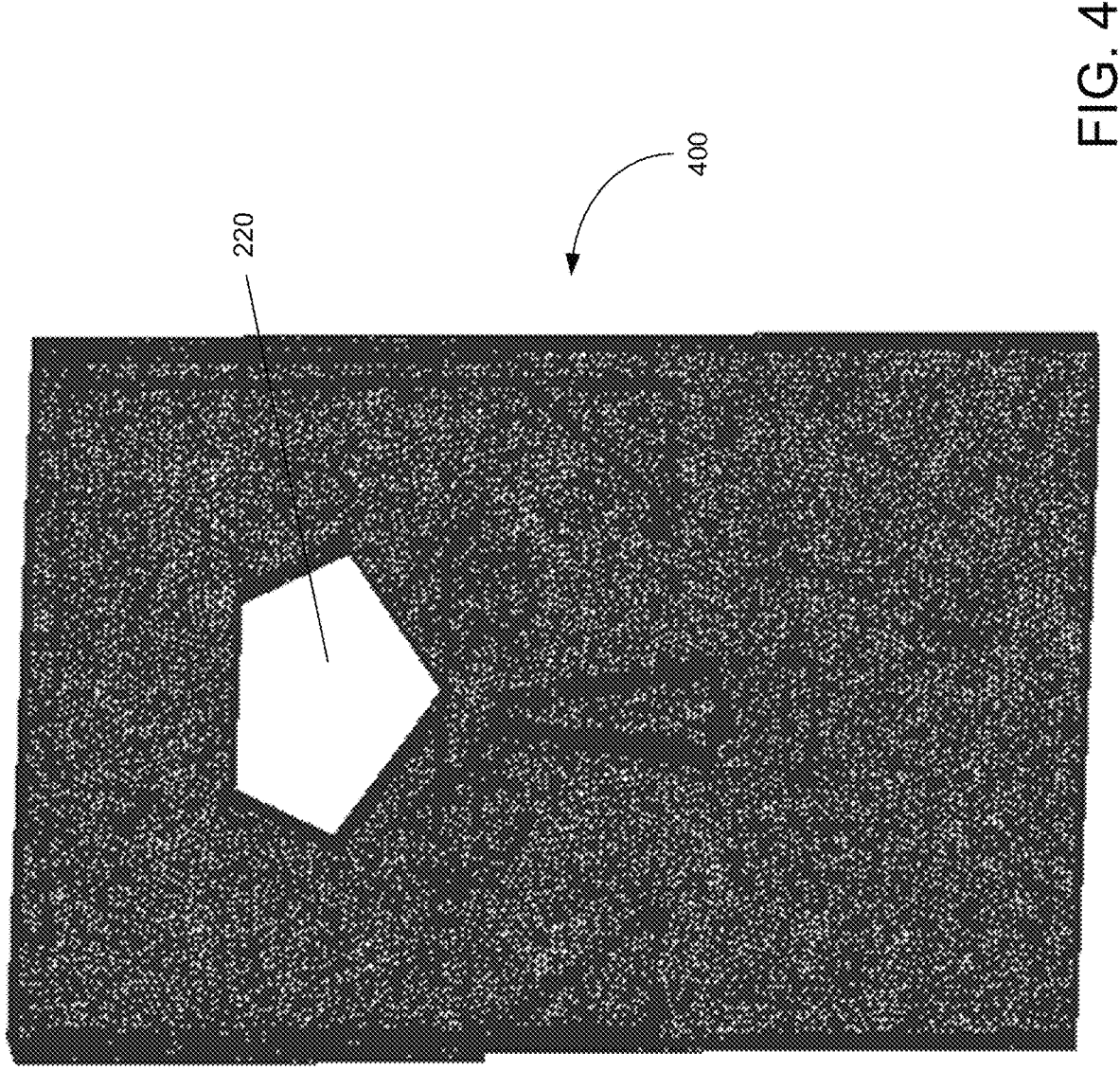
FIG. 4 shows a thermal model mesh of the thermal model of FIG. 2.

FIG. 2 is a front view of an example of a thermal model having a facial geometry 200. FIG. 3 is a back view of the thermal model of FIG. 2 having an outline for heaters 210. FIG. 4 shows a thermal model mesh 400 of the thermal model of FIG. 2. The heaters may be thin silicone rubber heaters or heater pads. Off-the-shelf electrical heaters may be used. The heaters are thermally coupled to the back side of the face block to heat the block. The back side of the face block may include a plurality of sections, as illustrated by the outline of FIG. 3, each for attaching one of the heaters. The thermal model may be created using a CAD (Computer Aided Design) model of a human face and its facial features.

The front of the thermal model represents the human face. The back of the model has two outlined sections (202, 204) for attaching two 2-inch by 2-inch heaters and four outlined sections (212, 214, 216, 218) for attaching four 2-inch by 6-inch heaters. A cutout 220 such as a pentagon cutout is disposed between the two 2-inch by 2-inch heater outlined sections. In this example, the pentagon cutout 220 is located on the forehead and may fit within a 3"×3" square. The cutout 220 is disposed below one of the four 2-inch by 6-inch heater outlined section (212) and above the other three outlined sections (214, 216, 218). The pentagon cutout 220 presents a thermal pass-through area that allows a thermal imaging camera to see the blackbody behind the face block and obtain a thermal reading thereof. The thermal imaging camera directs a radiation to the face block to detect the front side or surface of the face block as the human face and through the cutout 220 to measure a temperature of the blackbody to obtain a measured temperature of the blackbody. Of course, different numbers of heater outlined sections of different sizes and/or shapes may be used. A larger number of heater outlined sections may provide a more refined thermal model.

Figure 5B:
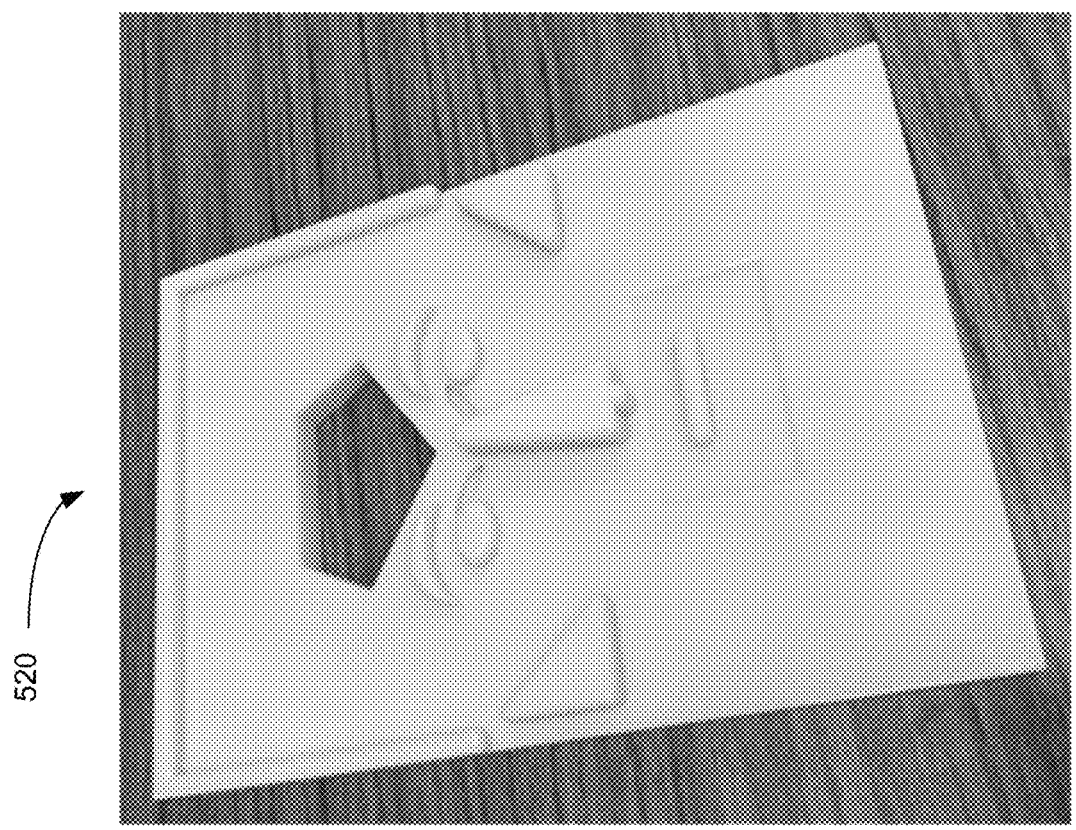
FIG. 5B shows an example of a thick 3D printed face block.
Figure 5A:
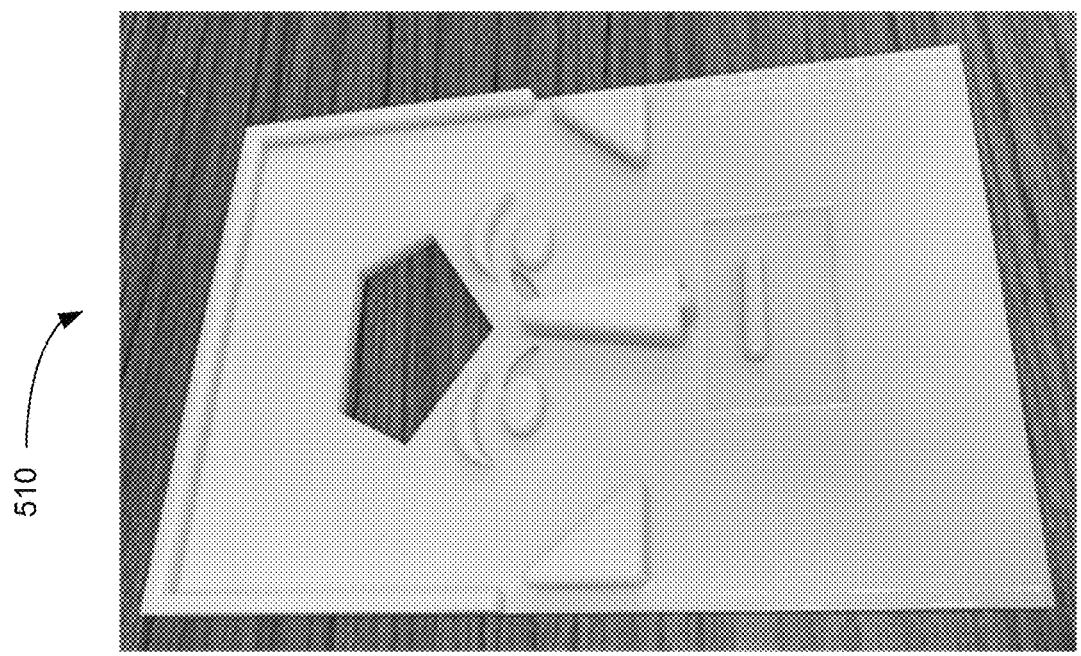
FIG. 5A shows an example of a thin 3D printed face block.

The thermal model is used to make a physical face block that, once heat is applied, will be identified as a human face by a thermal imaging camera. The face block may be made in various ways such as injection molding and 3D printing. FIG. 5A shows an example of a thin 3D printed face block 510. FIG. 5B shows an example of a thick 3D printed face block 520. Each face block may be a 7-inch×10-inch 3D printed block with a variable thickness.

In one example of a 3D printed face block using Polyjet, the model assumptions include a 5 $W/m^2K$ convection coefficient on all exposed surfaces and an isotropic thermal conductivity of 0.24 W/mK for the 3D printed material. The thermal conductivity, if not provided by the manufacturer of the Polyjet material, may be based on research and comparison to a similar plastic material. For the field test, a front sheet (see, e.g., FIGS. 8-10) may be attached to the front side of the face block and has an optical facial image of the human face. The front sheet may be a thin vinyl layer with a picture of a face applied to the front side of the face block. The thin vinyl layer is not accounted for in the thermal model but is assumed to have a negligible effect. Because the power in the electrical heaters can be increased or decreased with the power supply, the goal is to achieve temperature differences among the facial features that provide a realistic representation of a human face. Small errors in temperature values can be managed by adjusting the power supply.

In a preliminary field test, two different sizes of 12 VDC off-the-shelf adhesive-mount silicone rubber heaters are used as to heat the back side of the face block. The heaters cannot be overlapped or trimmed. They are chosen to fill as much of the back side as possible. A more refined design may use a custom shaped heater. Table 1 lists the electrical heaters that are used in the preliminary field test.

TABLE 1

Heaters Used for the Preliminary Field Test

| McMaster-Carr Part Number | Size (inches) | Maximum Power (W) |
| --- | --- | --- |
| 7945T41 | 2 × 2 | 20 |
| 7945T46 | 2 × 6 | 60 |

For the preliminary field test, the heaters are connected to a power supply and the current or voltage are dialed down to achieve the power needed to reach the desired front surface temperatures for the face block (or dialed up in other situations). The heaters may all be connected to one dual power supply, but it is possible to connect each one to a separate power supply in order to control individually each heater.

It may be important to measure the resistance of each heater to calculate the power dissipation because the values can vary due to manufacturing inconsistencies. Formulas 1 and 2 can be used to calculate the current and voltage, based on the measured heater resistance, required to produce the amount of power needed as follows, $$P=iV \quad (1)$$

$$P=V^2/R \quad (2)$$

where P is power in watts, i is current in amps, V is voltage in volts, and R is resistance in ohms.

The face block is configured to be attached to the blackbody. The face block has a variable thickness to represent facial features of a human face. In an example, the face block has a variable thickness based on a variable surface temperature profile of a human face. One or more heaters are thermally coupled to the block to produce heat to heat the face block. The variable thickness of the face block and the heat produced by the one or more heaters are selected to simulate thermally the human face on a front side of the face block. The one or more heaters and the power supply form a mechanism or means for heating the face block having the variable thickness to simulate thermally the variable surface temperature profile of the human face on the front side of the face block. In an example, the face block is thinner in thickness in some regions to produce higher surface temperatures on the front side of the face block and is thicker in thickness in other regions to produce lower surface temperatures on the front side of the face block when the face block is heated, based on the variable surface temperature profile.

The thin 3D printed face block 510 of FIG. 5A and the thick 3D printed face block 520 of FIG. 5B are used for the preliminary field test and for the thermal analysis. The thin and thick face blocks have base thicknesses of about 0.25 inches and about 0.5 inches, respectively. The facial features are identical on both versions.

Figure 6A:
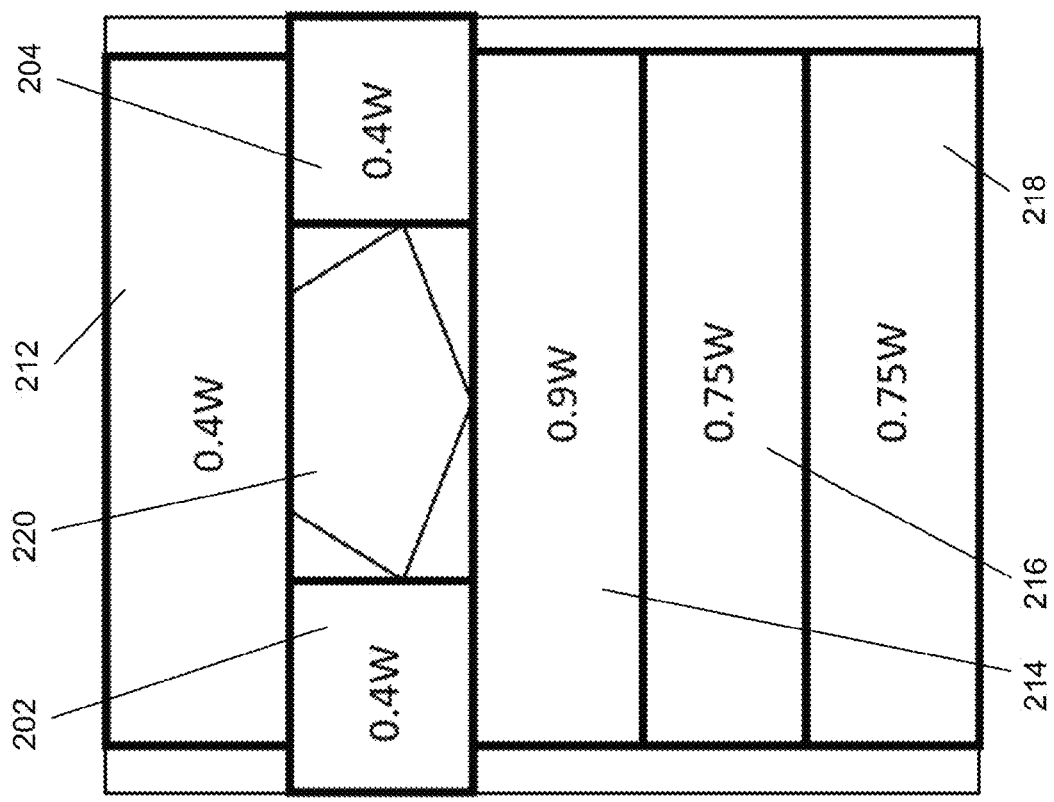
FIG. 6A is a back view of the thin 3D printed face block of FIG. 5A showing power input values of heating the thin 3D printed face block.
Figure 6B:
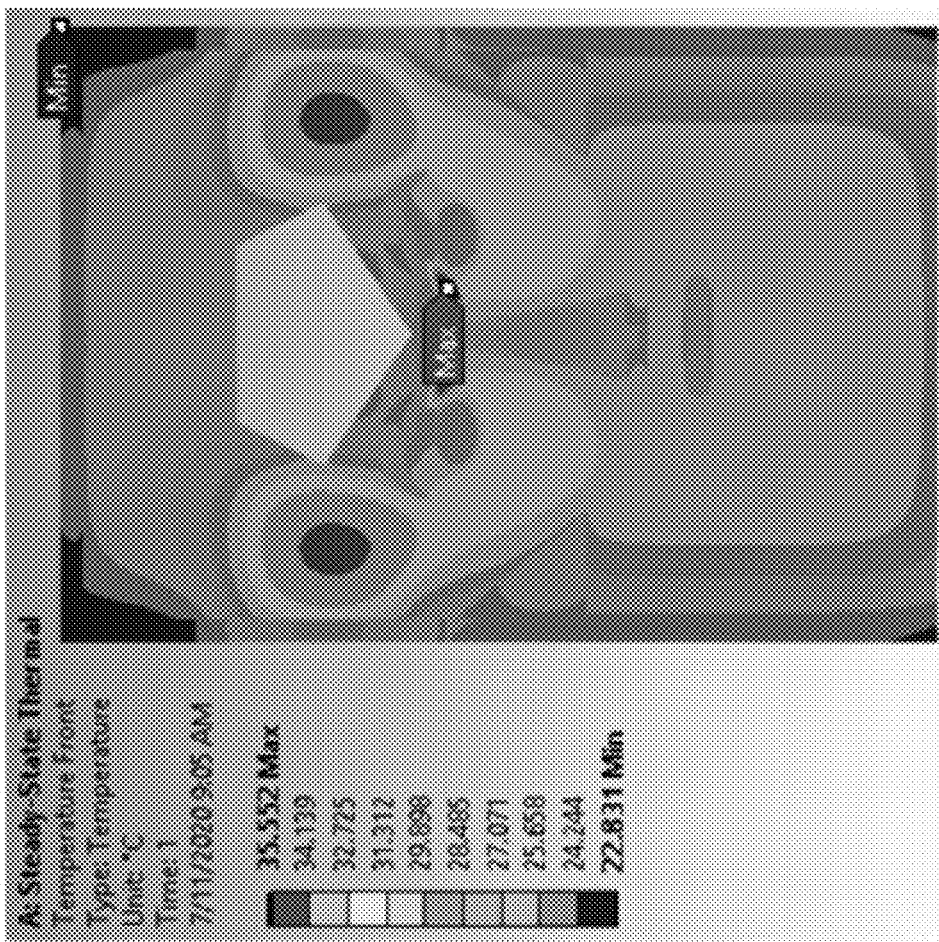
FIG. 6B is a front view of the thin 3D printed face block of FIG. 5A showing a thermal analysis result of calculated surface temperatures of the heated thin 3D printed face block.

FIG. 6A is a back view of the thin 3D printed face block of FIG. 5A showing power input values of heating the thin 3D printed face block 510. FIG. 6B is a front view of the thin 3D printed face block of FIG. 5A showing a thermal analysis result of calculated surface temperatures of the heated thin 3D printed face block 510. The power input values are used in the preliminary field study to achieve a maximum face temperature of about 35° C. In one example for the field test, the surface temperatures of the front of the 3D printed block are within the range of about 80° F. to about 95° F. (about 26.7° C. to about 35° C.). The face block having a variable thickness and the heating of the face block by the heaters combine to simulate the thermal signature of the human face.

For the thin face block 510 of FIG. 5A, the two 2-inch by 2-inch heaters on both sides (sections 202, 204) of the pentagon cutout 220 at the forehead and the one 2-inch by 6-inch heater above (section 212) the pentagon cutout 220 receive input power of 0.4 W. The one 2-inch by 6-inch heater immediately below (section 214) the pentagon cutout 220 receives input power of 0.9 W. The two remaining 2-inch by 6-inch heaters at the bottom (section 216, 218) receive input power of 0.75 W.

Figure 7A:
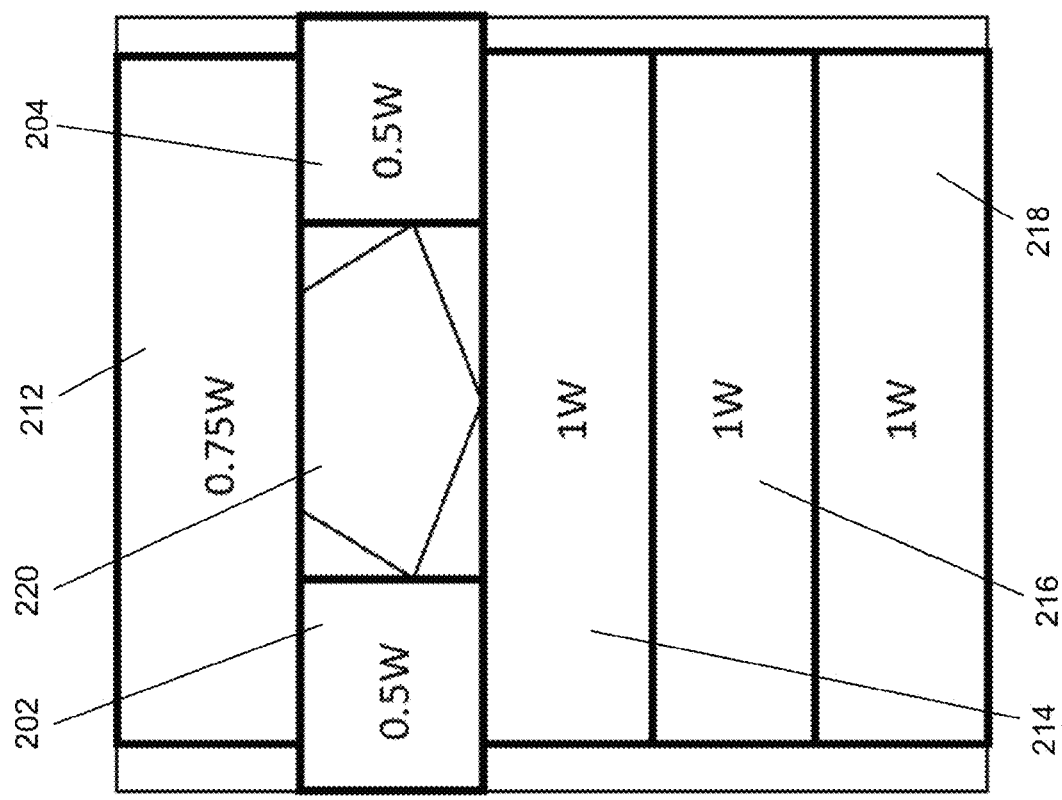
FIG. 7A is a back view of the thick 3D printed face block of FIG. 5B showing power input values of heating the thick 3D printed face block.
Figure 7B:
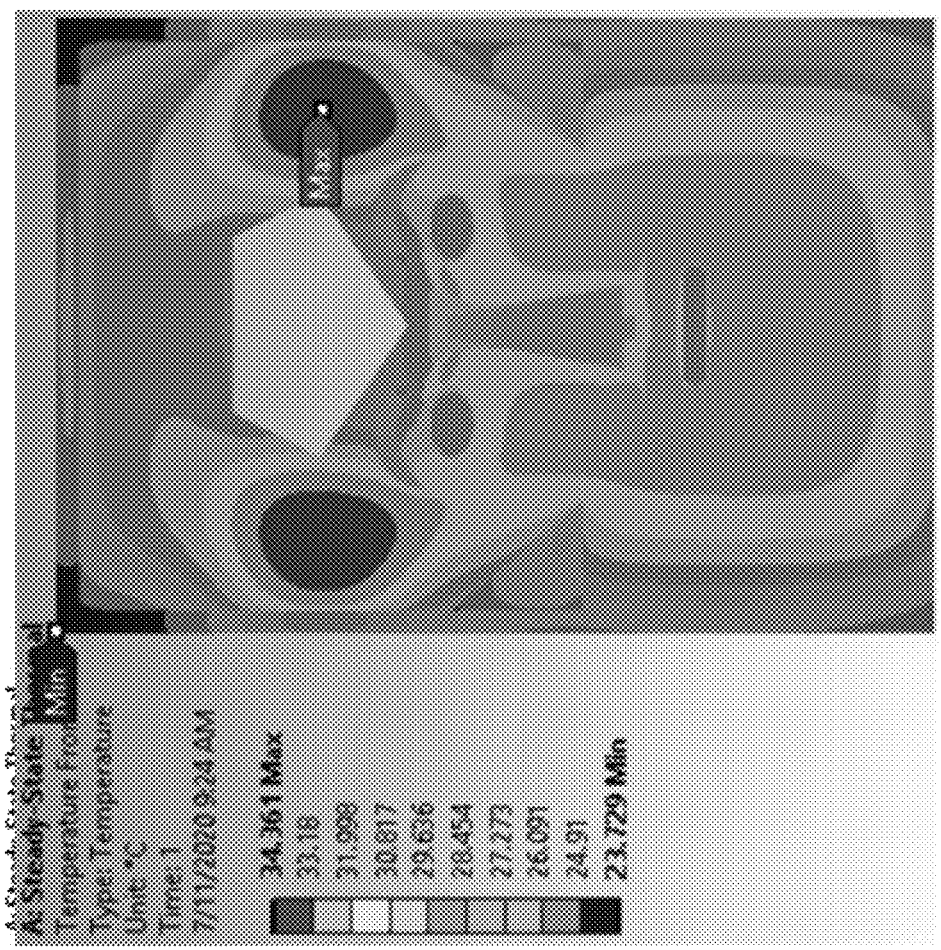
FIG. 7B is a front view of the thick 3D printed face block of FIG. 5B showing a thermal analysis result of calculated surface temperatures of the heated thick 3D printed face block.

FIG. 7A is a back view of the thick 3D printed face block of FIG. 5B showing power input values of heating the thick 3D printed face block 520. FIG. 7B is a front view of the thick 3D printed face block of FIG. 5B showing a thermal analysis result of calculated surface temperatures of the heated thick 3D printed face block 520. The power input values may be used to produce surface temperatures of the front of the 3D printed block within the range of about 80° F. to about 95° F. (about 26.7° C. to about 35° C.).

For the thick face block 520 of FIG. 6A, the two 2-inch by 2-inch heaters on both sides (sections 202, 204) of the pentagon cutout 220 at the forehead receives input power of 0.5 W and the one 2-inch by 6-inch heater above (section 212) the pentagon cutout receives input power of 0.75 W. The three 2-inch by 6-inch heaters below (sections 214, 216, 218) the pentagon cutout 220 receive input power of 1 W. As expected, the power values are higher for the thicker face (FIG. 7B) than the power values for the thinner face (FIG. 6B) in order to achieve similar surface temperatures.

Figure 8:
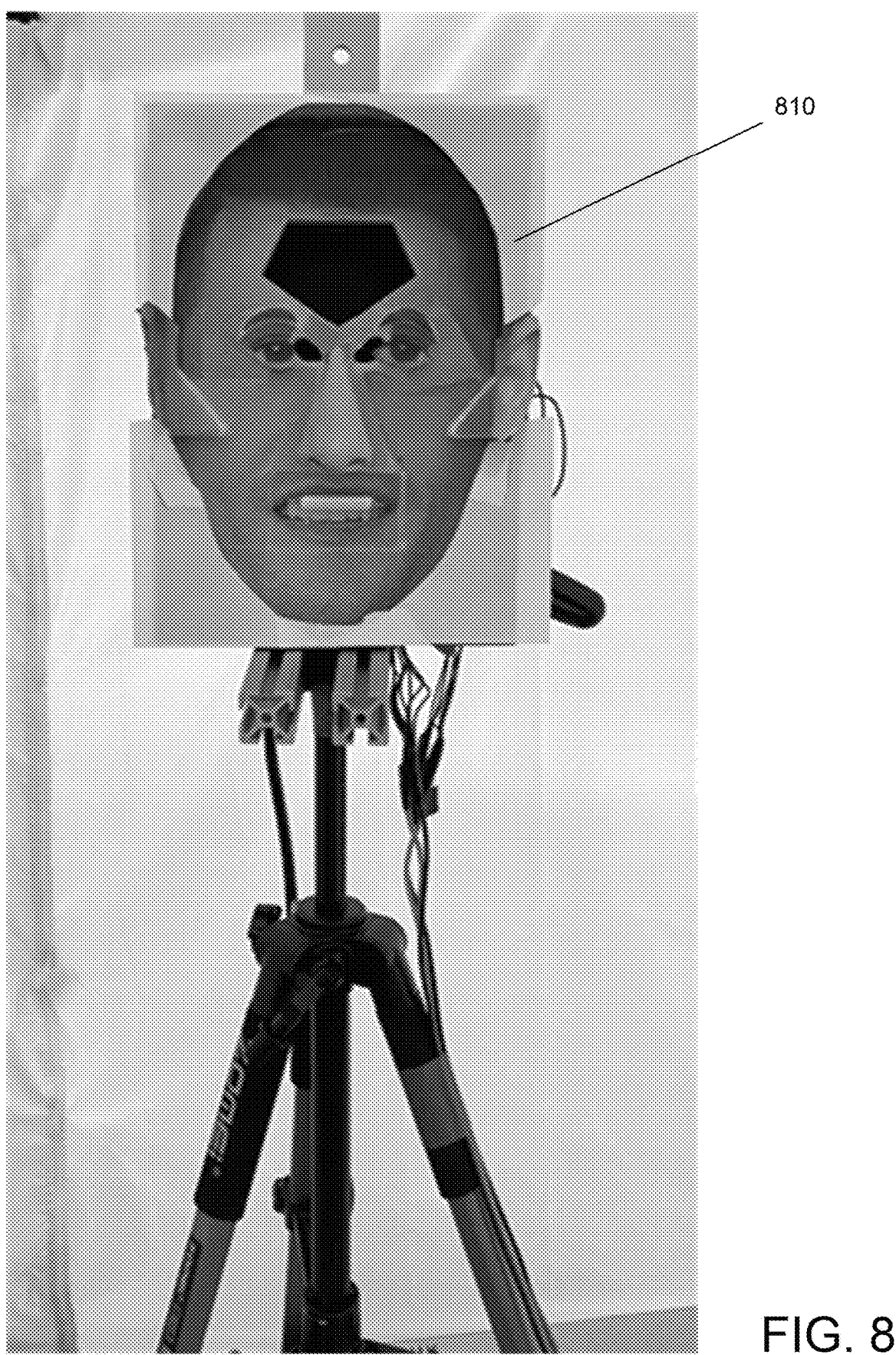
FIG. 8 is a view of a test setup showing a vinyl sticker applied to a 3D printed face block.

FIG. 8 is a view of a test setup showing a vinyl sticker applied to a 3D printed face block. The vinyl sticker is an optical facial image 810 which may be a photograph or a drawing of a human face. The optical facial image is not necessary for thermal imaging cameras that have the capability of facial detection in the thermal spectrum. It may be helpful for imaging devices that rely at least partially on optical imaging to detect the presence and location of a face. Such a test article is a more robust design piece that can simulate a human face in both the optical spectrum and the thermal spectrum.

Figure 9:
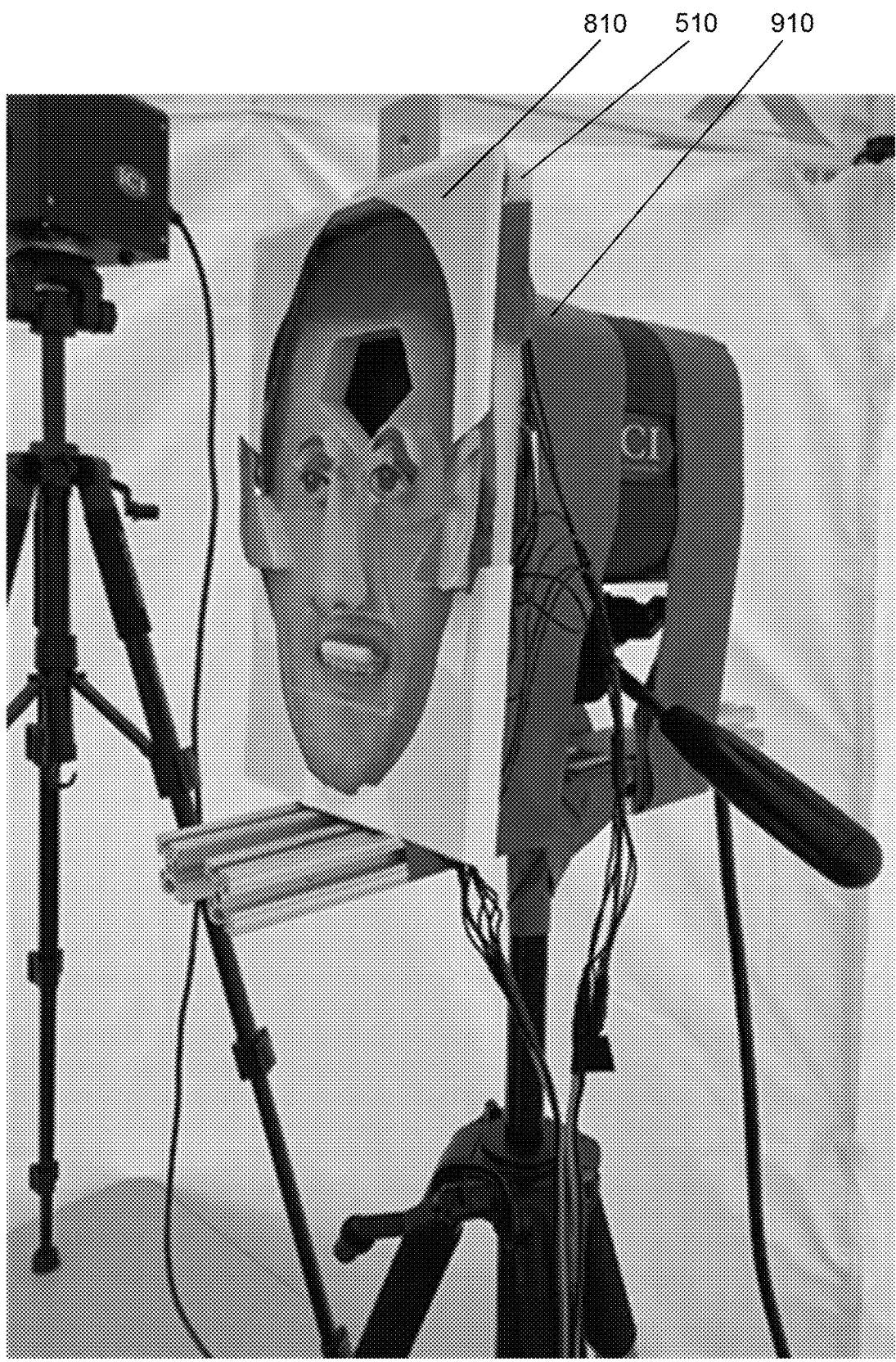
FIG. 9 is another view of the test setup of FIG. 8 showing the 3D printed face block attached to a blackbody.

FIG. 9 is another view of the test setup of FIG. 8 showing the 3D printed face block attached to a blackbody 910. The ¼ inch thinner face block 510 of FIG. 5A is used with the test setup for the field test. The blackbody 910 absorbs all incident electromagnetic radiation, regardless of frequency or angle of incidence. The pentagon cutout 220 in the forehead allows the thermal imaging camera to see the blackbody 910 behind the face block 510 through the cutout 220. In an example, the blackbody 910 has a temperature of about 97° F. to about 99° F. which is a range of normal body temperature of an adult. In another example, the blackbody has a temperature of over 99° F. which represents an elevated temperature of an adult with a fever. Because the blackbody 910 can be seen through the cutout 220 in the face block 510 and has a known temperature, it can be used for assessment and calibration of the thermal imaging camera. Instead of relying on live human subjects, the thermal imaging test article can be used to assess, calibrate, and/or validate a thermal imaging device for temperature measurement or the like after it is installed in it use environment. It can be used to ensure proper operation by taking into account environmental factors such as the presence of direct sunlight and any background thermal interferences.

A calibration process may compare the measured temperature of the blackbody 910 measured by the thermal imaging device and the known temperature of the blackbody. The thermal imaging device is then calibrated to match the measured temperature and the known temperature of the blackbody 910 to within an acceptable tolerance. The calibration process can be performed after installing the thermal imaging device in a use environment.

Figure 10:
FIG. 10 is another view of the test setup of FIG. 8 showing a tripod on which the 3D printed face block and blackbody are mounted and a power supply for heaters attached to the back of the 3D printed face block.

FIG. 10 is another view of the test setup of FIG. 8 showing a tripod on which the 3D printed face block and blackbody are mounted and a power supply for heaters attached to the back of the 3D printed face block. The heaters are connected to the power supply 1010 and the current or voltage can be to achieve the power needed to reach the desired front surface temperatures for the face block. The heaters may all be connected to one dual power supply as shown. In another embodiment, it is possible to connect each one to a separate power supply in order to control individually each heater. Small errors in temperature values can be managed by adjusting the power supply.

Figure 11:
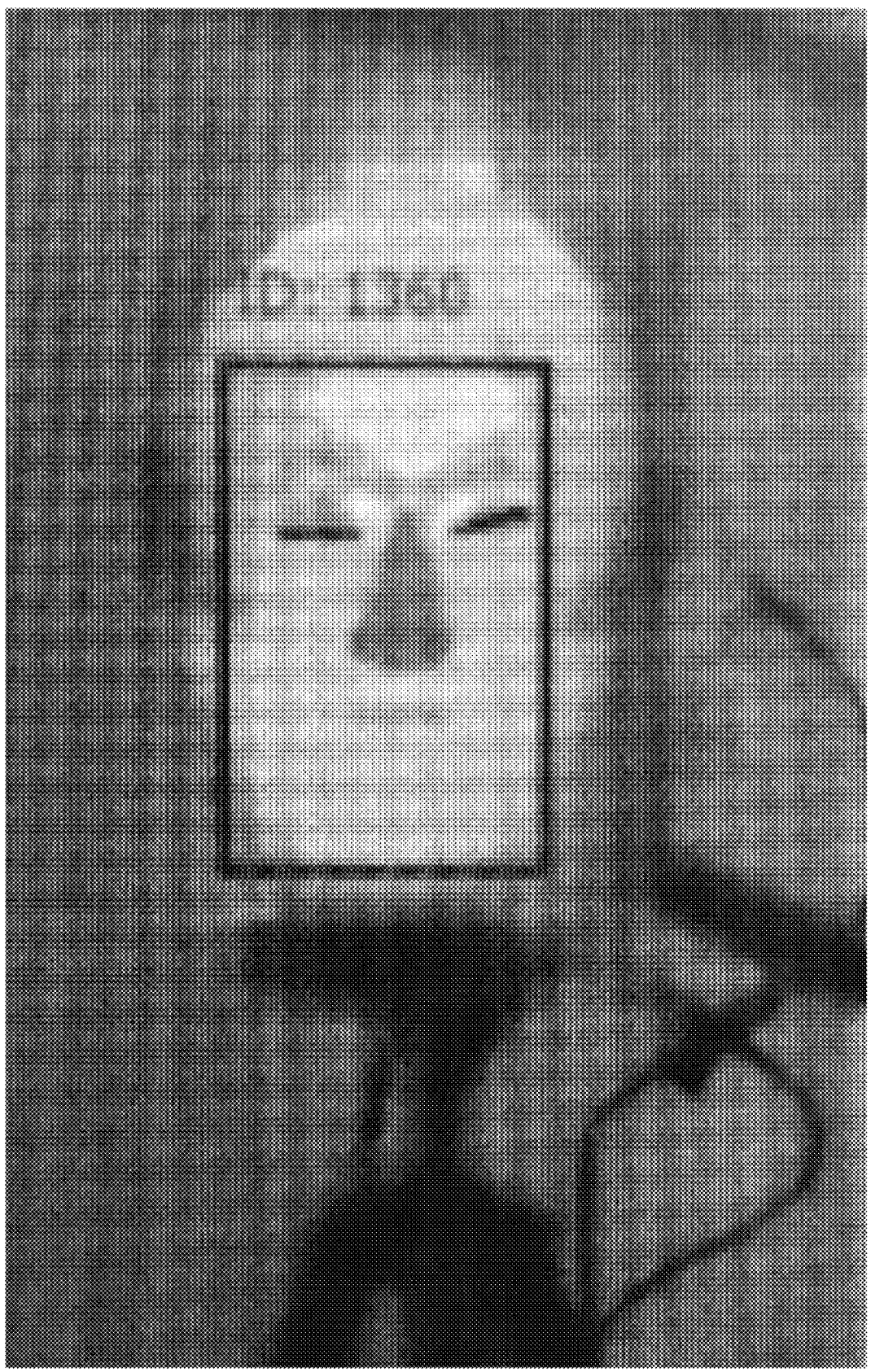
FIG. 11 is an image of a facial recognition software showing successful identification of a heated 3D printed face block as a human face by a thermal imaging camera.
Figure 12:
FIG. 12 is another image of a facial recognition software showing successful identification of a heated 3D printed face block as a human face by a thermal imaging camera.

FIG. 11 is an image of a facial recognition software showing successful identification of a heated 3D printed face block as a human face by a thermal imaging camera. FIG. 12 is another image of a facial recognition software showing successful identification of a heated 3D printed face block as a human face by a thermal imaging camera. The use of the facial recognition software to test the face block of the thermal imaging test article proves the design to be successful by identifying it as a human face. A process to validate the thermal imaging test article may include performing a facial recognition process on the front side of the face block and, if necessary, adjusting at least one of the variable thickness of the face block or the heating of the face block until the facial recognition process recognizes the front side of the face block as a human face. Triggering the facial recognition is critical to examining remote thermal screening systems as only the pixels on the face are used to derivate health metrics.

Figures 13, 14:
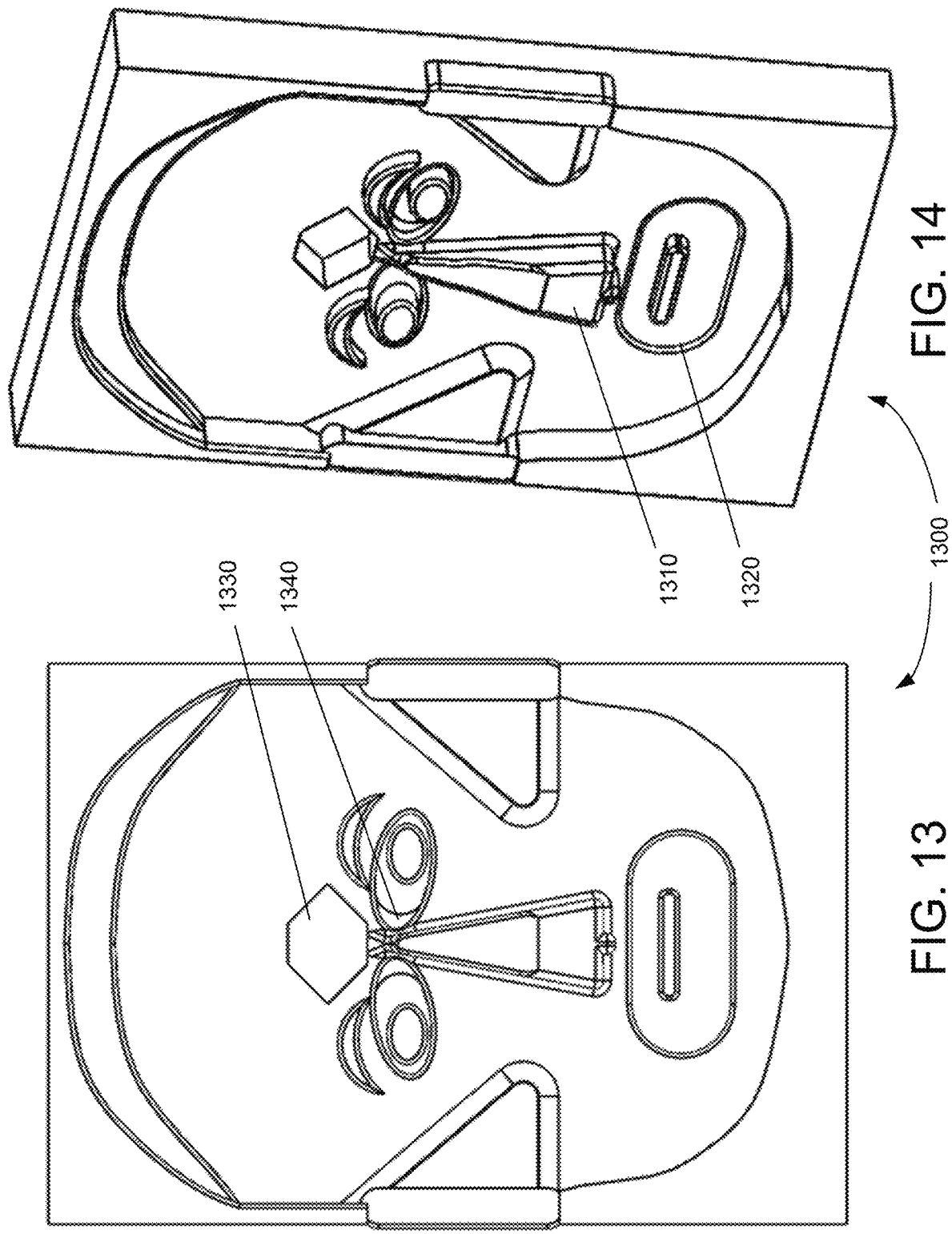
FIG. 13 is a front view showing an example of a CAD design having refined facial features for making a refined 3D printed face block.
FIG. 14 is an isometric view of the CAD design of FIG. 13.

FIG. 13 is a front view showing an example of a CAD design 1300 having refined facial features for making a refined 3D printed face block. FIG. 14 is an isometric view of the CAD design of FIG. 13.

Having achieved the success in the preliminary field test employing the above 3D printed face block 510, the CAD model may be modified to produce a thermal model which has more refined facial features as compared to the thermal model facial geometry 200 of FIG. 2. For example, the nose 1310 has more realistic details and the mouth 1320 is more rounded. The forehead opening or cutout 1330 may be changed from a pentagon to a smaller hexagon and additional inner eye corner openings or cutouts 1340 may be formed at the inner corners of the eyes for the blackbody to be visible through the openings. Infrared thermal imaging of the inner canthus of the eye is a good estimator of body core temperature. Adding the inner eye corner cutouts 1340 of the eyes is an improvement that better simulate a live human subject. Furthermore, the facial features may be further smoothed towards the base part of the face and the bridge of the nose may be more tapered.

The inventive concepts taught by way of the examples discussed above are amenable to modification, rearrangement, and embodiment in several ways. For example, different ways of heating the face block from those described herein can be used. Cutouts of different shapes, sizes, and arrangements may be provided on the face block.

Accordingly, although the present disclosure has been described with reference to specific embodiments and examples, persons skilled in the art will recognize that changes may be made in form and detail without departing from the spirit and scope of the disclosure.

What is claimed is:

1. A thermal imaging test article comprising:
   a block configured to be attached to a blackbody on a back side of the block, the block having a variable thickness to represent facial features of a human face, the block including a cutout to allow a thermal imaging device to see the blackbody behind the block through the cutout; and
   one or more heaters thermally coupled to the block to produce heat to heat the block;
   the variable thickness of the block and the heat produced by the one or more heaters being selected to simulate thermally the human face on a front side of the block.

2. The thermal imaging test article of claim 1, wherein the one or more heaters are thermally coupled to the back side of the block to heat the block.

3. The thermal imaging test article of claim 2, wherein the back side of the block includes a plurality of sections each for attaching one of a plurality of the heaters.

4. The thermal imaging test article of claim 1, wherein the block is thinner in thickness in some regions to produce higher surface temperatures on the front side of the block and is thicker in thickness in other regions to produce lower surface temperatures on the front side of the block when the block is heated.

5. The thermal imaging test article of claim 1, wherein the cutout is disposed on a forehead of the human face of the block.

6. The thermal imaging test article of claim 1, comprising: cutouts at inner corners of eyes of the human face of the block.

7. The thermal imaging test article of claim 1, further comprising:
   a front sheet attached to the front side of the block, the front sheet having an optical facial image of the human face.

8. A thermal imaging device assessment tool comprising:
   a face block configured to be attached to a blackbody on a back side of the face block, the face block having a variable thickness based on a variable surface temperature profile of a human face, the face block including a cutout to allow radiation to pass through to the blackbody behind the face block; and means for heating the face block having the variable thickness to simulate thermally the variable surface temperature profile of the human face on a front side of the face block.

9. The thermal imaging device assessment tool of claim 8, wherein the face block is thinner in thickness in some regions to produce higher surface temperatures on the front side of the face block and is thicker in thickness in other regions to produce lower surface temperatures on the front side of the face block, based on the variable surface temperature profile, when the face block is heated.

10. The thermal imaging device assessment tool of claim 8, wherein the cutout is disposed on a forehead of the human face of the face block.

11. The thermal imaging device assessment tool of claim 8, comprising:
cutouts at inner corners of eyes of the human face of the face block.

12. The thermal imaging device assessment tool of claim 8, further comprising:
a front sheet attached to the front side of the face block, the front sheet having an optical facial image of the human face.

13. A method of testing a thermal imaging device, the method comprising:
attaching a block to a blackbody on a back side of the block, the block having a variable thickness based on a variable surface temperature profile of a human face, the block including a cutout to allow radiation to pass through to the blackbody behind the block, the blackbody having a known temperature;
heating the block having the variable thickness to simulate thermally the variable surface temperature profile of the human face on a front side of the block; and
directing a radiation from the thermal imaging device to the block to detect the front side of the block as the human face and through the cutout to measure a temperature of the blackbody to obtain a measured temperature of the blackbody.

14. The method of claim 13, wherein heating the block comprises thermally coupling one or more heaters to the back side of the block to heat the block, based on the variable surface temperature profile of the human face.

15. The method of claim 13, further comprising:
making the block which is thinner in thickness in some regions to produce higher surface temperatures on the front side of the block and is thicker in thickness in other regions to produce lower surface temperatures on the front side of the block when the block is heated, based on the variable surface temperature profile of the human face.

16. The method of claim 13, further comprising:
forming the cutout on a forehead of the human face of the block.

17. The method of claim 13, further comprising:
forming cutouts at inner corners of eyes of the human face of the block.

18. The method of claim 13, further comprising:
attaching a front sheet to the front side of the block, the front sheet having an optical facial image of the human face.

19. The method of claim 13, further comprising:
comparing the measured temperature and the known temperature of the blackbody; and
calibrating the thermal imaging device to match the measured temperature and the known temperature of the blackbody to within an acceptable tolerance.

20. The method of claim 19, further comprising, prior to the comparing and the calibrating:
installing the thermal imaging device in a use environment.

21. The method of claim 13, further comprising:
performing a facial recognition process on the front side of the block;
adjusting at least one of the variable thickness of the block or the heating of the block until the facial recognition process recognizes the front side of the block as the human face.

\* \* \* \* \*